R. C. A. HOLZHAUSEN.
MIXING VALVE.
APPLICATION FILED AUG. 26, 1916.
1,231,609. Patented July 3, 1917.
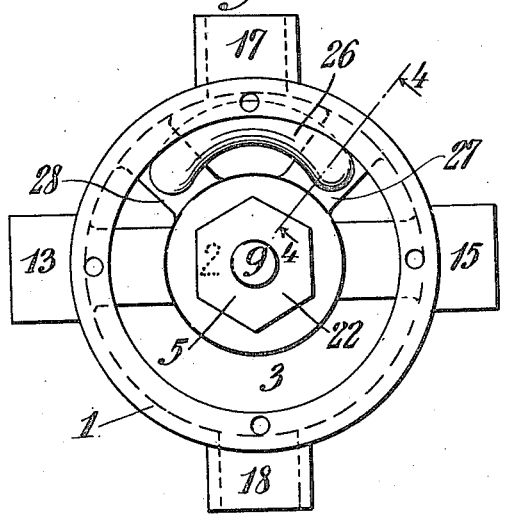
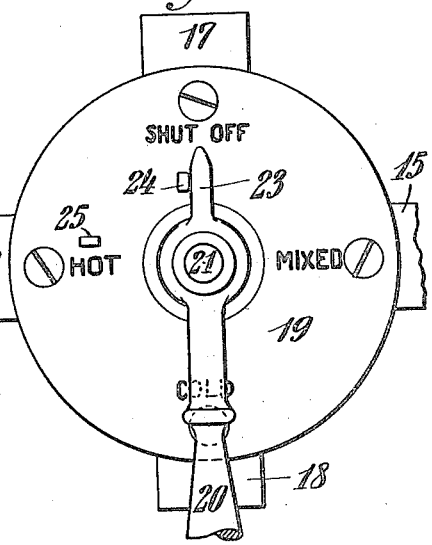
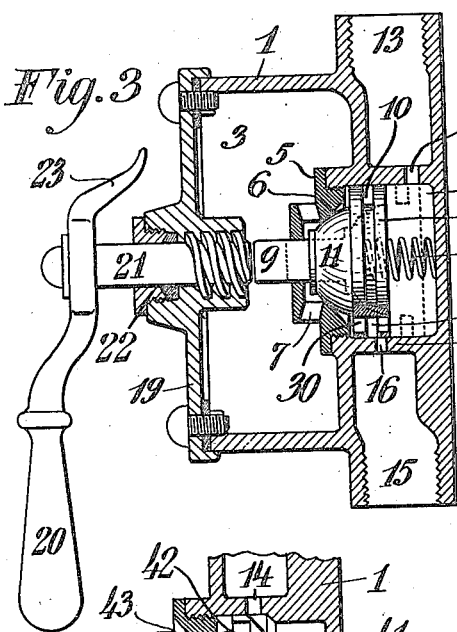
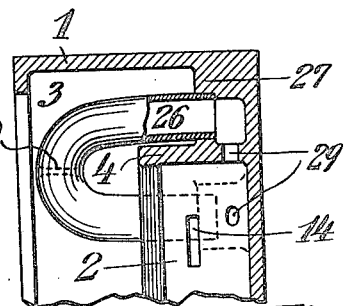
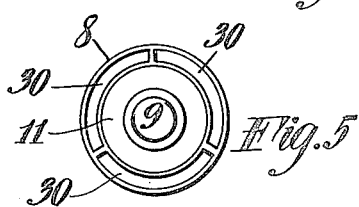
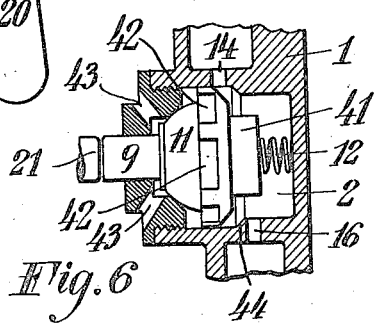
Richard C. A. Holzhausen, Inventor
By his Attorney
Ivan E. G. Königsberg

UNITED STATES PATENT OFFICE.

RICHARD C. A. HOLZHAUSEN, OF NEW YORK, N. Y.

MIXING-VALVE.

1,231,609.  Specification of Letters Patent.  Patented July 3, 1917.

Application filed August 26, 1916. Serial No. 116,955.

*To all whom it may concern:*

Be it known that I, RICHARD C. A. HOLZHAUSEN, a citizen of the United States, and resident of New York city, in the county of Bronx and State of New York, have invented certain new and useful Improvements in Mixing-Valves, of which the following is a specification.

The object of my invention is to provide a mixing valve of generally improved and simplified construction. One object of my invention is to provide a valve construction in which only a single valve is used for controlling the admission of hot and cold water. Another object is to provide a valve whereby both hot and cold water, as well as mixed hot and cold water may be obtained. Another object is to provide means for eliminating the knocking or hammering present in many valve constructions when the valve is shut off. Other objects of my invention are to generally improve the design and construction of mixing valves with a view of decreasing the number of parts and cheapening the cost of manufacture. Other objects will appear as this specification proceeds.

Accordingly my invention consists in a valve construction as hereinafter set forth and as illustrated in the accompanying drawing in which—

Figure 1 is a front elevation of a mixing valve embodying my invention.

Fig. 2 is a view of the valve with the cover removed.

Fig. 3 is a horizontal central sectional view through the valve and the hot and cold water inlets.

Fig. 4 is a sectional view of the means for eliminating hammering, taken on the line 4—4 of Fig. 2.

Fig. 5 is a plan view of the valve member, and

Fig. 6 shows a modification.

Referring to the drawing the reference numeral 1 denotes the valve casing which is preferably a cylindrical casting forming a valve chamber 2 and a mixing chamber 3. The valve chamber is inclosed by the cylindrical wall 4 and is closed by the valve seat plug 5 having a valve seat 6 and the outlet openings 7. The head of the valve plug 5 is preferably hexagonal as shown in Fig. 2 for convenience in securing it to the valve chamber by screwing.

The valve proper is represented at 8 and is provided with a stem 9 and an annular groove 10. 11 is a rubber washer adapted to seat against the valve seat 6 under tension by the spring 12 which serves to close the valve.

The cold water enters the valve chamber through inlet 13 and port 14 in the wall 4, and the hot water enters the valve through the inlet 15 and the port 16 in the valve chamber wall. Outlet 17, Fig. 2, may communicate with a shower, not shown, and outlet 18 may lead into a sink or bath tub, not shown. Both of said outlets lead of course from the mixing chamber 3.

The mixing chamber is closed by the cover 19 which supports the operating handle 20 on the screw threaded stem 21. A stuffing box 22 protects against leakage as is obvious. The handle 20 carries a pointer 23 adapted to indicate to the operator the several temperatures of water obtainable by turning the handle so that said pointer points to "Mixed", "Cold", or "Hot" as the case may be, or to "Shut off" in order to close the valve. Stops 24 and 25 limit the movements of the handle and protect the valve against incorrect operation.

In order to eliminate the unpleasant hammering of the water which occurs when the valve is turned off there is provided a reservoir in the form of the pipe 26 which is inserted in the hollow bosses 27, 28 in the bottom of the casing and secured as by soldering for instance. The pipe 26 forms a reservoir which communicates with the valve chamber through one or more openings 29, 29 as seen in Fig. 4.

The operation of the valve is as follows:—When the pointer 23 stands vertical as in Fig. 1 the valve is closed and the valve seated as shown in Fig. 3,—in which the handle is shown vertical for the sake of illustration, though in reality it appears horizontal or at right angle to the inlets 13 and 15.

The valve is provided with apertures 30, 30, Fig. 5, extending through the valve body 8 and through which apertures the water passes from the valve chamber into the mixing chamber. When the valve is closed as in Fig. 3 no water can pass the valve seat and into the mixing chamber.

When the pointer is turned to "Mixed," the handle stem 21 is screwed inwardly and depresses the valve 8 by acting against the valve stem 9. The parts are so designed that a quarter turn of the handle stem, more or less, moves the valve sufficiently to uncover the port 16 and the hot water then passes into the mixing chamber 3 through the annular groove 10 and the openings 30 and 7, and at the same time the cold water passes through the latter into the mixing chamber and mixed hot and cold water is obtained. The parts may be so arranged that the hot water port 16 will always bleed or leak slightly to insure that mixed water is obtained at once when the valve is opened by turning the pointer to "Mixed."

A further turn of the hand to "cold" position causes a further depression of the valve 8 until the port 16 is closed and the hot water shut off and only cold water passes through the valve.

A still further turn of the handle to "hot" position depresses the valve sufficiently to close the cold water port 14, as shown in dotted lines, and only hot water passes into the mixing chamber. A reverse movement of the handle operates the valve in the reverse manner as will be understood.

The closing of the valve would ordinarily be followed by a knocking or hammering caused, I believe, by the sudden resistance against the passage of the water through the pipes when the valve is closed. This knocking is at times so objectionable that it bars the valve from actual use. In this instance, however, I have succeeded in completely overcoming this objectionable feature by the use of the reservoir 26. When the valve is closed the water therein has an opportunity to and does pass into the reservoir whereby the sudden stop of the water is eliminated and the knocking prevented. I may close one end of the reservoir, or place a partition in it as indicated at 40 and the result will be the same. I have found this feature to cause the valve to operate without the knocking noise.

It will be noted that this valve construction is very simple and well adapted for its purpose. When the valve is to be used in bath tubs, hot water is not desired and by making the valve 8 somewhat longer so that it cannot be fully depressed, of course eliminates the hot water feature, which in the case of kitchen sinks is necessary and may be obtained with the construction shown. Thus it is only necessary to carry two different patterns for the valve itself, while the other parts serve for both purposes as will be understood.

The valve 41 shown in Fig. 6 is operated in the same manner as the valve 8 in Fig. 3. In this case when the valve is first depressed or operated, the hot and the cold water passes through the grooves or cut out portions 42 in the valve and through the openings 43 in the valve plug into the mixing chamber and out so that mixed water is obtained. A still further depression seats the valve on the seat 44 thereby shutting off for the hot water and only cold water is obtained. So with this construction the hot water feature is absent.

While I have shown my invention in its preferred form it is obvious that I do not intend limiting myself otherwise than is indicated by the scope of the appended claim.

I claim:—

In a mixing valve the combination of a valve casing forming a mixing chamber and a valve chamber, an apertured valve seat plug for closing the valve chamber from the mixing chamber, a valve in said valve chamber, means for normally seating the valve against the said valve seat plug to close the apertures therein, means for admitting water to said valve chamber through ports in the wall thereof, said valve having an annular groove and a stem, a cover for said casing, an operating stem in threaded engagement with the said cover and adapted to engage the said valve stem to cause said annular groove to register with one of the said ports at predetermined intervals during the operation of the valve and a hollow member within said mixing chamber, said hollow member communicating with the said valve chamber for receiving the water therefrom when the valve is closed.

Signed at New York in the county of New York and State of New York this 22nd day of August A. D. 1916.

RICHARD C. A. HOLZHAUSEN.